United States Patent
Wei

(10) Patent No.: US 6,401,494 B2
(45) Date of Patent: Jun. 11, 2002

(54) METHOD FOR MAKING GLASSES CONTAINING RARE EARTH FLUORIDES BY PRECIPITATING SOLUTION DOPED COMPOUNDS

(75) Inventor: Huailiang Wei, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/915,781

(22) Filed: Jul. 26, 2001

Related U.S. Application Data

(62) Division of application No. 09/268,768, filed on Mar. 15, 1999.

(51) Int. Cl.$^7$ ............................................... C03C 17/02
(52) U.S. Cl. ............................... 65/390; 65/397; 65/399
(58) Field of Search ............................... 65/390, 397, 399

(56) References Cited

U.S. PATENT DOCUMENTS

| | | | | |
|---|---|---|---|---|
| 4,110,096 A | * | 8/1978 | Macedo | |
| 4,263,031 A | | 4/1981 | Schultz | ............................. 65/3 |
| 4,299,608 A | * | 11/1981 | Macedo et al. | ............. 65/30.13 |
| 4,302,231 A | * | 11/1981 | Macedo et al. | ............. 65/30.13 |
| 4,389,233 A | * | 6/1983 | Kurosaki et al. | .............. 501/12 |
| 4,410,345 A | * | 10/1983 | Usui et al. | ....................... 65/31 |
| 4,936,650 A | | 6/1990 | Ainslie et al. | ............ 350/96.34 |
| 5,254,148 A | * | 10/1993 | Inami et al. | ................... 501/12 |
| 5,262,365 A | | 11/1993 | Oyobe et al. | .................. 501/54 |
| 5,439,495 A | * | 8/1995 | Koike et al. | ................... 501/12 |
| 5,858,892 A | * | 1/1999 | Kinoshita | ..................... 501/12 |
| 5,955,388 A | * | 9/1999 | Dejneka | ......................... 501/3 |

FOREIGN PATENT DOCUMENTS

| | | | | |
|---|---|---|---|---|
| AU | B-71855/91 | * | 8/1991 | .................. 65/390 |
| DE | 2833051 | * | 2/1979 | .................. 65/399 |
| JP | 5-279066 | * | 10/1993 | .................. 65/390 |

* cited by examiner

*Primary Examiner*—John Hoffmann
(74) *Attorney, Agent, or Firm*—Vincent T. Kung

(57) ABSTRACT

A method that provides a new way to embed rare earth fluorides into silicate (or germania-doped silica) glasses by means of solution chemistry. Embedding rare earth fluorides into a silicate (or germania-doped silica) glass comprises the following steps. First, form a porous silicate core preform. Second, submerge the preform into an aqueous solution of rare earth ions. Third, remove the preform from the solution and wash the outside surfaces of the preform. Fourth, submerge the preform into an aqueous solution of a fluorinating agent to precipitate rare earth trifluorides from the solution and deposit in the pores or on the wall of the preform. This is followed by drying.

14 Claims, No Drawings

METHOD FOR MAKING GLASSES CONTAINING RARE EARTH FLUORIDES BY PRECIPITATING SOLUTION DOPED COMPOUNDS

RELATED APPLICATION

This Application is a division of co-pending, allowed U.S. application Ser. No. 09/268,768, entitled "GLASSES CONTAINING RARE EARTH FLUORIDES," filed in the name of Huai-liang Wei, on Mar. 15, 1999, the contents of which is incorporated herein by reference, and this Application claims priority thereto.

TECHNICAL FIELD

The invention relates to a new process for embedding rare earth fluorides into silica glasses. The new embedded glasses are useful as optical amplifiers for telecommunications.

BACKGROUND ART

In recent years there has been an explosive deployment of optical amplifiers, particularly erbium doped fiber amplifiers, in optical telecommunication systems. This phenomenon is due in part to the well-recognized advantages that these types of devices have over repeater type amplification schemes. For example, the erbium doped fiber amplifier (EDFA), which conveniently operates in the preferred 1550 nm, or so-called third telecommunication spectral window, has high polarization-non-sensitive gain, low cross talk between signals at different wavelengths, good saturation output power, and a noise figure close to the fundamental quantum limit. The excellent noise characteristics potentially allow hundreds of amplifiers to be incorporated along the length of a optical fiber link, which could span thousands of kilometers. Optical amplifiers, particularly EDFAs, in contrast to electronic repeaters, are also transparent to data rate, signal format and wavelength over a limited range, making them especially useful for wavelength multiplexed communication systems that simultaneously transmit a large number of signals using different wavelength bands for each signal.

Currently, germania-doped silica and heavy metal fluoride (such as ZBLAN) glasses are used as hosts for rare earth ions, such as erbium and praseodymium, to make fiber amplifiers. Silica base glasses are chemically and mechanically stable. They are both relatively easy to fabricate and fuse with germania-doped silicate fibers. Existing silicate glasses, however, are inefficient for infrared upconversion because of their large phonon energy. On the other hand, fluoride glasses have low phonon energy, but are very difficult to fiberize. Fluoride glasses are also difficult to fuse with silicate fibers.

Transparent oxyfluoride glass-ceramics, which are comprised of fluoride microcrystals in a glassy matrix, offer unique properties of high chemical durability and a low phonon energy environment for rare earth ions dopants. These glass-ceramics are made by melting oxides and fluorides of cation components to form an oxyfluoride glass. Typically, the glass-ceramic is made in a two-step ceramming process. A first heat treatment forms nuclei in the glass, from where in a second heat treatment the fluoride microcrystals grow. Because these transparent oxyfluoride glass-ceramics generally have lower melting temperatures, higher refractive indexes and higher thermal expansion coefficients than silicate glasses, they may pose a challenge to making fiber amplifiers that are covered with a pure silica overcladding.

Accordingly, there continues to be a need for a glass-ceramic material that is CTE-matched for use in optical amplifiers and methods for making such products. In particular, there is a need for new ways for embedding rare earth fluorides into glasses suitable for making optical amplifiers.

SUMMARY OF THE INVENTION

Briefly, the present invention relates to a silica-based glass containing rare earth-fluoride crystals. In another aspect, the invention relates to a method for embedding rare earth fluorides into silica-based (or germania-doped silicate) glasses by means of solution chemistry. The term "silica-based glass" or "silicate glass" as used herein refers to any glass having silica and/or germania-doped silica as the predominant component of greater than or equal to about 70% by weight.

The rare-earth-ion-doped glass preforms, according to the present invention, have a fundamental composition, on an oxide-basis in terms of weight percent, comprising (or consisting essentially of):

| Oxide | Weight Percent |
|---|---|
| $SiO_2$ and $GeO_2$ | 85–99.0 |
| $Al_2O_3$ and $Ga_2O_3$ | 0–14.9 |
| $RE_xF_y$ | 0.01–2.0 |
| $R_xF_y$ | 0.1–2.0 | wherein X and Y are integers not equal to 0. The amounts of $SiO_2+GeO_2$ are fully interchangeable. Each component—$SiO_2$ or $GeO_2$—could range from 0% to about 99%, as long as the total sum of $SiO_2+GeO_2$ is between about 85% and 99%. The sums of $Al_2O_3$ and $Ga_2O_3$ also are interchangeable. R is an alkali or alkaline-earth ion such as Na, K, Li, Ca, or Mg. RE is a rare-earth ion.

DETAILED DESCRIPTION OF THE INVENTION

As contemplated, the method for embedding rare earth fluorides into a silicate (or germania-doped silica) glass comprises the following steps. First, one provides a porous silicate preform. Preferably the preform is formed as a porous silica core by an oxide vapor deposition (OVD) process. Preferably, the preform has a pore size of about 500 nm or smaller, more preferably, in the range of about 200 nm to about 300 nm or 400 nm. Second, one submerges the preform into an aqueous solution containing rare earth ions. Preferably the solution is a nitrate solution such as $Er(N03)_3$, $Pr(N03)_3$, $Nd(NO_3)_3$, $Dy(N0_3)_3$, or a combination of these nitrates. At this stage, the pores in the preform fill with the aqueous solution of rare earth ions. Third, the preform is removed from the nitrate solution and washed out using deionized water to remove any extra amounts of nitrate on the outside surfaces of the preform. Fourth, one submerges the preform into an aqueous solution of a fluorinating agent, such as ammonium bifluoride, ammonium fluoride, HF or KF. Fluoride ions diffuse into the pores and the following reaction occurs, $RE^{3+}+3F^{1-} \rightarrow REF_3$, wherein rare earth trifluorides precipitate out from solution and deposit in the pores or on the wall.

A fifth step entails drying the preform at about 300° C. in a vacuum to remove any remaining water inside the pores. Generally after the drying step, the preform is still porous. Hence, in a sixth step, one heats the preform again in a chlorine or fluorine environment to remove any residual water and finally consolidates the preform into a non-porous glass body, which may serve as a preform for useful articles and devices such as fibers for optical amplifiers.

The melting points of rare earth fluorides range from 1143° C. ($HoF_3$) to 1515° C. ($ScF_3$), which are lower than the melting point of silica (1710° C.) and close to the sintering temperature of germania-doped silica. Therefore, in the sixth step, normal consolidation procedure for OVD core preforms can be used to consolidate the fluoride-silica preforms.

In an alternate embodiment, the fourth step may be carried out by flowing/diffusing fluorine or fluorine-containing gases, such as HF, into the pores of the preform.

The refractive indexes of the embedded fluorides can be adjusted by mixing the rare earth fluorides with alkali or alkaline earth fluorides, such as LiF ($n_D$=1.395), $CaF_2$ ($n_D$–1.434), SrF ($n_D$=1.442) and $MgF_2$, which have lower refractive indexes and are not as soluble in water. The size of fluoride microcrystals can be adjusted by controlling the concentration of solutions and pore surface treatments.

Doping the glasses with a rare earth metal is desirable for enhancing the emission and absorption spectra, as discussed above. Therefore, the silica preforms of the present invention include a rare earth element, such as Y, La, Ce, Pr, Nd, Pm, Sm, Eu, Gd, Tb, Dy, Ho, Er, Tm, Yb or Lu. Preferably, the rare earth element is Er, Pr, Eu or Dy. Even more preferably, the rare earth element is Er (e.g., $ErF_3$). The glasses also may contain various other components. For instance, the glasses may further include up to 5 wt % of other oxides, such as $Y_2O_3$, $La_2O_3$, CdO, $B_2O_3$, SnO, $ZrO_2$, $P_2O_5$, $Sb_2O_5$, $As_2C_5$ or $Bi_2O_3$.

The rare earth fluoride-containing, silica-based glass of the invention is suitable for both making and using in optoelectronic devices such as optical fibers or optical amplifiers, which offer the unique properties of transparent oxyfluoride glass-ceramics discussed above. In addition, the inventive silica-based optical amplifiers, when used with silica overcladding, provide the added benefit of matched CTE and refractive index between the fiber and the cladding.

Although the present invention has been disclosed in these embodiments, persons skilled in the art can see that numerous modifications and changes may be made without departing from the intended spirit and scope of the invention.

I claim:

1. A method for embedding rare earth fluorides into a silicate glass, the method comprises the steps of:

providing a porous silicate preform;

submerging the preform into an aqueous solution of rare earth ions;

removing the preform from the aqueous solution of rare earth ions;

washing the preform;

submerging the washed preform into an aqueous solution of a fluorinating agent, to precipitate rare earth trifluorides in and on the preform; and drying the preform.

2. The method according to claim 1, further comprising drying the dried preform in a chlorine or fluorine environment.

3. The method according to claim 1, wherein the porous silicate preform is made by oxide vapor deposition.

4. The method according to claim 1, wherein the porous silicate preform has a pore size of about 500 nm or smaller.

5. The method according to claim 1, wherein the porous silicate preform has a pore size in the range of about 200 nm to about 400 nm.

6. The method according to claim 1, wherein the aqueous solution of rare earth ions is a nitrite solution of $Er(NO3)_3$, $Pr(NO_3)_3$, $Nd(NO3)_3$, $Dy(NO3)_3$ or combinations thereof.

7. The method according to claim 1, wherein the preform removed from the aqueous solution of rare earth ions is washed using deionized water.

8. The method according to claim 1, wherein the fluorinating agent is selected from the group consisting of: ammonium fluoride, ammonium bifluoride, HF and KF.

9. The method according to claim 1, wherein the aqueous solution of rare earth ions fills the pores of the porous silicate preform.

10. The method according to claim 1, wherein the fluorinating agent diffuses into the pores of the porous silicate preform to react with the rare earth ions.

11. The method according to claim 10, wherein the reaction produces rare earth trifluorides.

12. The method according to claim 1, wherein the preform is dried at about 300° C. in a vacuum.

13. The method according to claim 1, wherein the silicate glass is a germania-doped silicate.

14. The method according to claim 1, further comprising the step of consolidating the preform to form a non-porous structure.

* * * * *